US009603087B2

(12) United States Patent
Carmon et al.

(10) Patent No.: US 9,603,087 B2
(45) Date of Patent: Mar. 21, 2017

(54) GREEN FEMTOCELLS AND METHODS OF IMPLEMENTING THE SAME (75) Inventors: Rafael Carmon, Rishon Lezion (IL); Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 1 day.

(21) Appl. No.: 13/517,898

(22) Filed: Jun. 14, 2012

(65) Prior Publication Data

US 2013/0095836 A1 Apr. 18, 2013

Related U.S. Application Data (60) Provisional application No. 61/548,662, filed on Oct. 18, 2011.

(51) Int. Cl.
*H04W 24/02* (2009.01)
*H04W 36/32* (2009.01)
(Continued)

(52) U.S. Cl.
CPC ........ *H04W 52/0206* (2013.01); *H04W 24/02* (2013.01); *H04W 84/045* (2013.01); *Y02B 60/50* (2013.01)

(58) Field of Classification Search
CPC ........ H04W 4/021; H04W 8/10; H04W 8/14; H04W 4/02; H04W 64/00; H04W 36/32;
(Continued)

(56) References Cited

U.S. PATENT DOCUMENTS 7,307,971 B2 12/2007 Park et al.
7,477,920 B2 * 1/2009 Scheinert et al. ............ 455/561
(Continued)

FOREIGN PATENT DOCUMENTS

CN 101754303 A 6/2010
CN 101754306 A 6/2010
(Continued)

OTHER PUBLICATIONS

Deutsche Telekom, "Green RAN: UE Based Reactivation of Deactivated RAN Nodes for Energy Saving," 3GPP Draft, R2-110116 Energy Saving, $3^{rd}$ Generation Partnership Project (3GPP), Ireland, Jan. 2011 (9 pages).
(Continued)

*Primary Examiner* — Khawar Iqbal
(74) *Attorney, Agent, or Firm* — Sterne, Kessler, Goldstein & Fox P.L.L.C.

(57) ABSTRACT

A femtocell for conserving power, which includes a transmitter module configured to be inactive for periods of call inactivity and data inactivity within a corresponding femtocell geographic coverage area, and includes a monitoring device configured to monitor the femtocell geographic coverage area, and further includes a controller module configured to cause a call handover to the femtocell when a cellular handset device is functioning and is located within the femtocell geographic coverage area. The femtocell also being configured to communicate with one or more macrocell base stations, each having a corresponding macrocell, which are configured to facilitate communication between the cellular handset device and a wireless network.

20 Claims, 5 Drawing Sheets (51) Int. Cl.
*H04W 52/02* (2009.01)
*H04W 84/04* (2009.01)

(58) Field of Classification Search
CPC . H04W 52/0206; H04N 1/00068; G01S 5/10; G01S 17/48; G01S 5/00; G01S 5/0242; G01S 5/06; G01S 5/12; G01S 5/14
USPC .............. 455/418, 438, 436, 444, 450, 561; 370/331, 338
See application file for complete search history.

(56) References Cited

U.S. PATENT DOCUMENTS

| | | | |
|---|---|---|---|
| 8,306,540 B2 | 11/2012 | Hsieh et al. | |
| 8,345,633 B2 | 1/2013 | Bradley et al. | |
| 8,768,336 B2* | 7/2014 | Kilgour | H04W 56/0035 455/422.1 |
| 8,792,851 B2* | 7/2014 | Matsumura | H04W 52/0206 455/403 |
| 8,805,381 B2* | 8/2014 | Brisebois | H04K 3/43 455/443 |
| 9,100,909 B2* | 8/2015 | Conte | H04W 52/0225 |
| 2009/0253461 A1* | 10/2009 | Kuwahara | 455/561 |
| 2009/0285143 A1* | 11/2009 | Kwun | H04W 52/0229 370/311 |
| 2010/0111047 A1* | 5/2010 | Yang et al. | 370/336 |
| 2010/0113035 A1* | 5/2010 | Eskicioglu | H04W 36/0083 455/444 |
| 2010/0124931 A1 | 5/2010 | Eskicioglu et al. | |
| 2010/0130222 A1 | 5/2010 | Claussen et al. | |
| 2011/0076960 A1 | 3/2011 | Yun et al. | |
| 2011/0149885 A1* | 6/2011 | Bachu et al. | 370/329 |
| 2011/0189993 A1* | 8/2011 | Lee | H04W 8/06 455/435.1 |
| 2011/0223913 A1* | 9/2011 | Kho et al. | 455/435.1 |
| 2011/0250896 A1* | 10/2011 | Takano | 455/445 |
| 2011/0287755 A1* | 11/2011 | Cho et al. | 455/418 |
| 2011/0319086 A1* | 12/2011 | Katori | 455/440 |
| 2012/0015655 A1* | 1/2012 | Lee | H04W 8/02 455/435.1 |
| 2012/0300686 A1* | 11/2012 | Maeda | H04W 52/0206 370/311 |
| 2013/0029676 A1* | 1/2013 | Guvenc et al. | 455/450 |
| 2013/0095835 A1 | 4/2013 | Carmon et al. | |
| 2013/0102309 A1* | 4/2013 | Chande et al. | 455/435.1 |
| 2013/0244736 A1* | 9/2013 | Ho et al. | 455/574 |
| 2014/0011519 A1* | 1/2014 | Lee | H04W 8/24 455/456.1 |
| 2014/0141785 A1* | 5/2014 | Wang | H04W 36/32 455/441 |
| 2014/0219254 A1* | 8/2014 | Fujishiro | H04W 28/08 370/332 |
| 2015/0305060 A1* | 10/2015 | Seo | H04J 11/005 455/452.1 |

FOREIGN PATENT DOCUMENTS

| | | |
|---|---|---|
| CN | 101801049 A | 8/2010 |
| CN | 102014421 A | 4/2011 |
| CN | 102215536 A | 10/2011 |
| CN | 102217372 A | 10/2011 |
| EP | 1983786 A1 | 10/2008 |
| EP | 2079263 A1 | 7/2009 |
| EP | 2 107 840 A2 | 10/2009 |
| EP | 2197228 A1 | 6/2010 |
| EP | 2214434 A1 | 8/2010 |
| EP | 2299759 A1 | 3/2011 |
| EP | 2375807 A1 | 10/2011 |
| KR | 10-2011-0034827 A | 4/2011 |
| TW | 201136370 A1 | 10/2011 |
| WO | WO 2005/015917 A2 | 2/2005 |
| WO | WO 2010/066165 | 6/2010 |
| WO | WO 2011/101998 A1 | 8/2011 |

OTHER PUBLICATIONS

3GPP Standard, "3$^{rd}$ Generation Partnership Project; Technical Specification Group Core Network and Terminals; Study on Impacts on Signaling Between User Equipment (UE) and Core Network From Energy Saving (Release 11)," France, Jun. 2011 (33 pages).

European Search Report for EP Application No. 12 00 7057, European Patent Office, Munich, Germany, mailed on Feb. 28, 2013 (4 pages).

3GPP TSG RAN WG3 Meeting #61 (R3-081949), "Dynamic Setup of HNBs for Energy Savings and Interference Reduction," *Mitsubishi Electric*, Jeju Island, Korea, Aug. 18-22, 2008; 7 pages.

European Search Report for EP Patent Application No. EP 120006105.6, European Patent Office, Munich Germany, mailed Nov. 8, 2012; 4 pages.

English-language abstract of CN102014421 A, dated Apr. 13, 2011; 2 pages.

English-language abstract of CN 101801049 A, dated Aug. 11, 2010, 1 page.

English-language abstract of CN 102215536 A, dated Oct. 12, 2011; 1 page.

Kwon, Sungoh et al., "Virtual Extension of Cell IDs in Femtocell Environment," Wireless Communication and Networking Conference (WCNC), 2011 IEEE, IEEE, Mar. 28, 2011, pp. 428-433.

Office Action directed to related Taiwanese Patent Application No. 101138251, mailed on Sep. 25, 2014; 10 pages.

Office Action directed to related Taiwanese Patent Application No. 101133019, mailed Oct. 28, 2014; 7 pages.

Office Action directed to related Chinese Patent Application No. 201210371776.5, mailed Oct. 30, 2014; 8 pages.

Office Action directed to related Chinese Patent Application No. 201210397929.3, mailed Nov. 3, 2014; 8 pages.

* cited by examiner

GREEN FEMTOCELLS AND METHODS OF IMPLEMENTING THE SAME

CROSS REFERENCE TO RELATED APPLICATIONS

This application claims the benefit of U.S. Provisional Patent Application No. 61/548,662, filed Oct. 18, 2011, which is incorporated herein by reference in its entirety.

BACKGROUND OF THE INVENTION

Field of the Invention

The invention generally relates to small scale base stations (femtocells), and more specifically to implementations of green femtocells.

Related Art

Femtocells are small scale base stations, typically installed by users, designed to enhance in-building cellular services. Femtocells typically are utilized within mobile phone networks, and generally cover smaller areas than traditional cellular macrocells. Femtocells allow service providers to extend service coverage and enhance capacity indoors, as well as to other areas where access would otherwise be limited or unavailable. However, under normal operating conditions, femtocells are constantly "ON," meaning that a femtocell's transmitter is constantly transmitting both a broadcast channel (BCH) as well as a pilot signal. This constant transmission by the femtocells occurs regardless of whether any cellular handsets (UEs) are actively engaged on a call. Consequently, this constant transmission by the femtocells sometimes may cause interference with other wireless equipment such as WiFi, macrocells or other femtocell transmissions. Because the use of femtocells in residential areas is increasing dramatically, this constant transmission of the BCH and pilot by the femtocells creates additional concerns pertaining these residential deployments. For example, many individuals and groups are concerned about the potential health risks caused by the radiation associated with the continual transmission of signals by the femtocells, particularly in densely populated residential areas.

In accordance with existing cellular standards such as Global System for Mobile Communications (GSM), 2G, 3G or LTE, femtocells can be configured to act like macrocell base stations. In this configuration, femtocells generally consume a great deal of power which may not be justified, given the application. The constant transmission of the BCH and the pilot, associated with these conventional femtocells, also results in significant power consumption. This large power consumption renders a wide spread deployment of conventional femtocells relatively inefficient.

Thus, a need exists for a "green" femtocell that conserves power, limits radiation emissions and minimizes interference towards WiFi, macrocells, and/or other femtocells.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Embodiments of the invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Although the description of the present invention is to be described in terms of femtocells, those skilled in the relevant art(s) will recognize that the disclosed embodiments of the present invention may be applicable to other base stations or mobile network elements without departing from the spirit and scope of the present invention.

An Exemplary Macrocellular Network Including a Femtocell

Figure 1A:
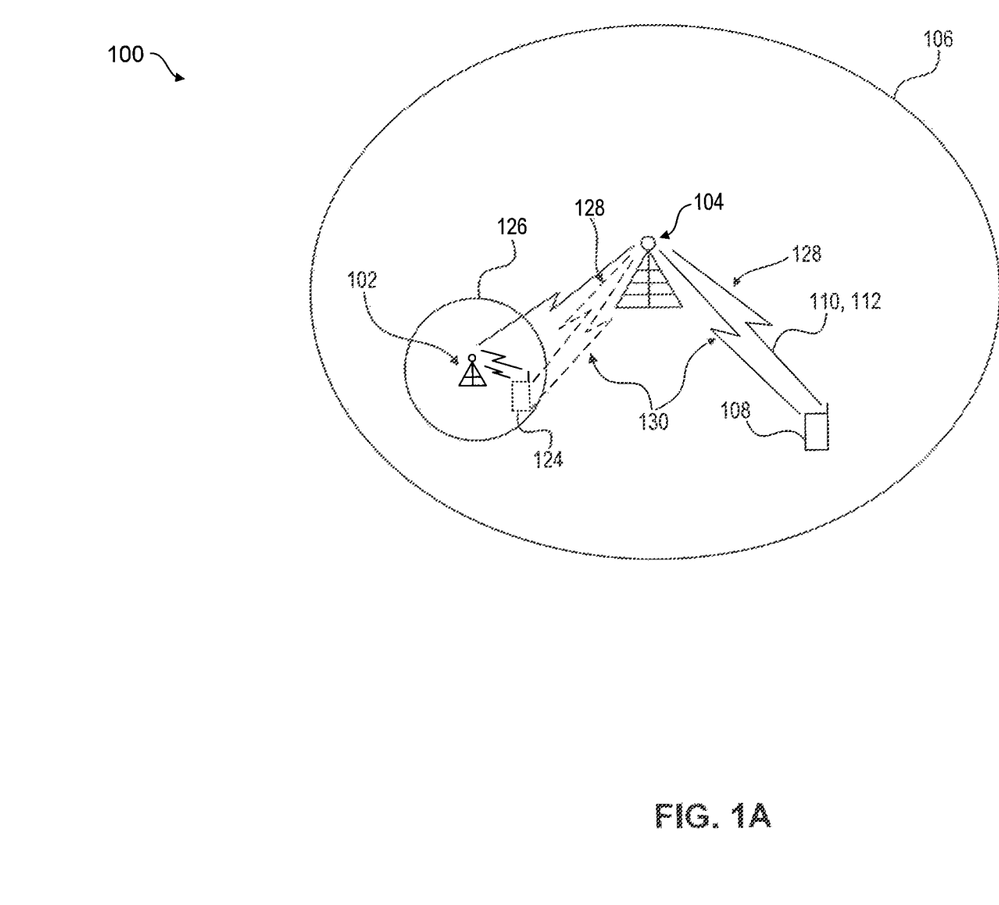
FIG. 1A illustrates a block diagram of a portion of a macrocellular network having a femtocell located therein, according to an exemplary embodiment of the present invention.

FIG. 1A illustrates a block diagram of a portion of a macrocellular network 100 having a femtocell 102 located therein, according to an exemplary embodiment of the present invention. Macrocellular network 100 includes one or more macrocell base stations 104, a femtocell 102, and one or more mobile handsets (UEs).

A macrocell base station is a traditional base station used in wireless networks (e.g. GSM, CDMA and TDMA) to communicate with UEs. A macrocell base station 104 has an associated macrocell 106. Within macrocell 106, a signal being broadcast from macrocell base station 104 can be received and used by a mobile handset (UE) 108. Macrocell base station 104 is configured to continuously transmit both a broadcast channel (BCH) 110 and a pilot 112. A UE 108 that enters macrocell 106 is able to detect BCH 110 and pilot 112, and subsequently may be registered with macrocell base station 104. If macrocell base station 104 did not transmit a BCH 110 and pilot 112, a UE 108 would be unable to determine which, if any, base stations were in the vicinity of UE 108. A UE 108 monitors BCH 110 and pilot 112 to communicate with the mobile telecommunication network. Therefore, under normal operations, when UE 108 is within macrocell 106, the UE 108 is registered with macrocell base station 104.

UEs 108 and 124 are mobile handsets configured to communicate with one or more wireless networks in accordance with standard protocols. In embodiments, UEs 108 and 124 may be updated cellular handsets, which may have at least some additional functionality beyond the functionality required by the existing mobile standards (e.g., GSM, 2G, 3G or LTE). For example, UEs 108 and 124 may support transmission of a special signal, which may be configured to notify the one or more femtocells that the UE is preparing to engage in a call setup. The special signal may be substantially similar to a random access (discussed below) that is transmitted from a femtocell. The special signal may be configured such that any macrocell base stations, which may be present within macrocellular network 100, substantially ignore the special signal because the content is not applicable to the macrocell base stations.

In embodiments, macrocell 106 may have one or more femtocells completely or partially within its coverage area. In some embodiments, macrocell 106 may have a range up to approximately several kilometers, while the femtocells may have a range of only several meters. Femtocell 102 is configured to operate as a "green" femtocell. Thus, femtocell 102 may be placed into a lower power state until triggered by an occurrence in the network. In embodiments, the trigger is the presence of a call setup signal to or from a UE within its coverage area. In alternate embodiments, the trigger may be the receipt of a "wake-up" message from a UE. A femtocell 102 within macrocell 106 is able to cause a handover from macrocell base station 104 under predetermined conditions when UE 108 moves into a femtocell geographic coverage area 126 (shown in FIG. 1 as a second UE 124). An example of a handover is a process of transferring an ongoing call or data session from one base station (e.g., macrocell base station 104) connected to the mobile telecommunication network to another base station (e.g., femtocell 102). For example, when femtocell 102 is turned "ON," such that its transmitter is activated, and second UE 124 is located within femtocell geographic coverage area 126, femtocell 102 may cause a handover of an existing call involving second UE 124. Communications to/from second UE 124 would then go through femtocell 102, rather than via macrocell base station 104.

In some embodiments, femtocell 102 also includes a monitoring device, which may be configured to monitor the femtocell geographic coverage area 126 for the presence of UEs (e.g. UE 124). Femtocell 102 further includes a controller module, which may be configured to cause a handover of an existing call involving second UE 124, to femtocell 102, when second UE 124 is functioning (e.g. the presence of a call setup involving second UE 124) and is located within femtocell geographic coverage area 126. The controller module may also be configured to activate and deactivate the transmitter according to occurrences within the network. For example, the transmitter may be inactive for periods of call inactivity and data inactivity within femtocell geographic coverage area 126, and may be active for substantially all other situations.

A handover may also be initiated by the femtocell. In this embodiment, femtocell 102 monitors the BCH 110 and pilot 112 transmitted by the macrocell base station 104. For example, femtocell 102 may periodically monitor macrocellular network 100 (e.g. uplink 128 and/or downlink 130) to detect the existence of BCH 110 and pilot 112. In some arrangements, several different macrocells base stations may provide coverage within femtocell geographic coverage area 126. Thus, femtocell 102 may be configured to monitor the uplinks 128 and/or downlinks 130 for several base stations.

By monitoring these uplinks and/or downlinks, femtocell 102 is capable of "sniffing" the surrounding environment to determine if there is a call setup being handled by one of the macrocell base station in the vicinity. As discussed above, femtocell 102 detects the presence of a macrocell base station based on whether the femtocell 102 detects a BCH 110 or pilot 112 over one of the uplinks 128 or downlinks 130. Therefore, prior to detection of a call setup, femtocell 102 may already know the exact BCH associated with the detected macrocell base station, as well as the precise channel that will ultimately be used by a UE when the UE begins a call. Femtocell 102 is configured to then sniff the surrounding environment for a call setup, which may represent either a call delivery to second UE 124, or a call initiation from second UE 124.

Thus, when femtocell 102 detects that second UE 124 is involved in a call setup with macrocell base station 104, femtocell 102 turns itself "ON" and begins transmitting its own BCH and pilot. Second UE 124 may then detect the BCH and pilot transmitted from femtocell 102, and if the signal quality associated with femtocell 102 is greater than the signal quality associated with macrocell base station 104, femtocell 102 may cause a call handover procedure from macrocell base station 104.

After the femtocell is turned "ON," a module within the UE determines whether to initiate a handover. Throughout this handover process, a femtocell 102 may appear to the UE 108 as a macrocell base station. Therefore, second UE 124 may monitor the surrounding area to determine if there are any neighboring base stations in the vicinity, meeting predefined characteristics (e.g. signal quality above a threshold). When second UE 124 detects that there is a neighboring base station meeting this predefined criteria (e.g., femtocell 102), second UE 124 indicates this to the base station (e.g., macrocell base station 104) that is currently handling second UE 124's call or data session. A transfer of the call or data session to femtocell 102 may then be initiated.

Femtocell 102 is also configured to prevent false alarm situations. An example of a false alarm is when a femtocell triggers itself to turn "ON" (e.g., enables its transmitter) even when a UE is not within its geographic coverage area. For example, even when uplink 128 and/or downlinks 130 between macrocell base station 104 and UE 108 are detected by femtocell 102, femtocell 102 may not be unable to provide service to UE 108. By preventing these false alarm situations, femtocell 102 can further reduce power consumption, radiation emissions as well as interference towards WiFi or other femtocells. These benefits may be a result of femtocell 102 being able to reduce the number of instance where it has to power itself "ON" (e.g. when a UE is not within its geographic coverage area).

Figure 1B:
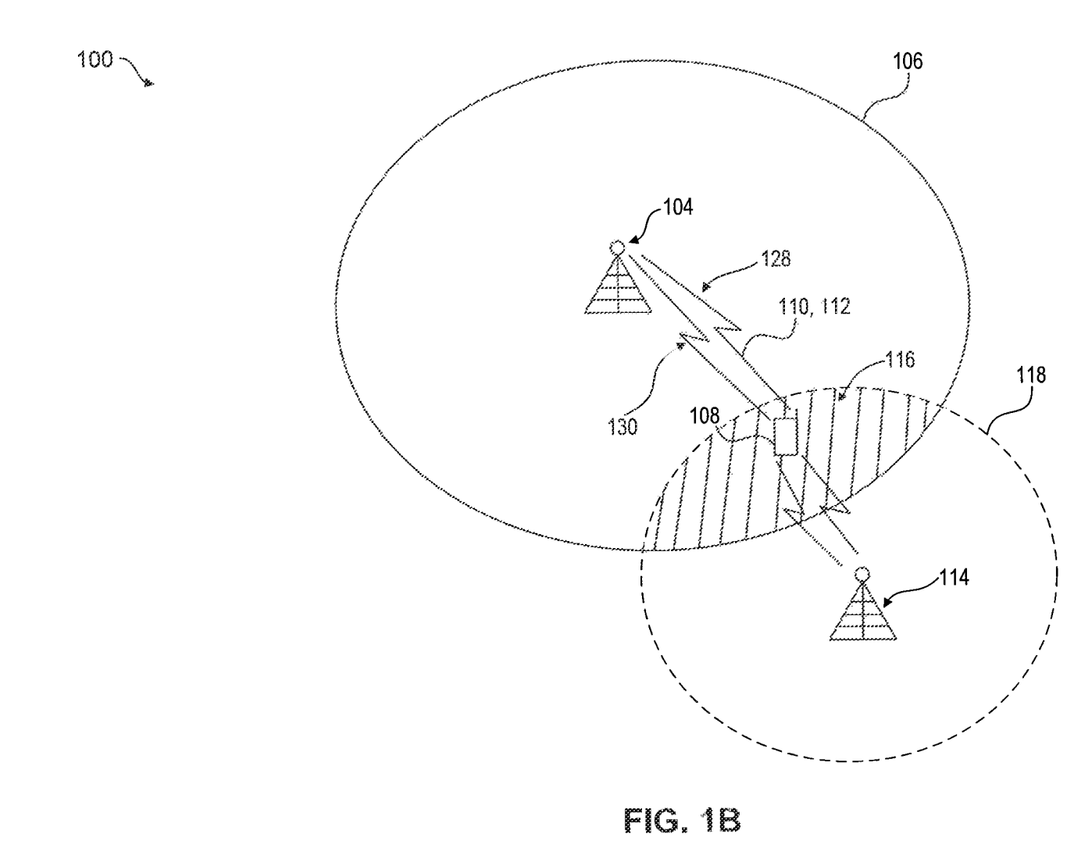
FIG. 1B illustrates a block diagram of a portion of a macrocellular network having multiple macrocell base stations located therein, according to an exemplary embodiment of the present invention.

Referring also to FIG. 1B, a block diagram of a portion of macrocellular network 100 having multiple macrocell base stations (e.g. macrocell base stations 104 and 114) located therein, according to an exemplary embodiment of the present invention, is illustrated.

In a macrocell network, macrocells often partially overlap. Therefore, a UE 108 located in an overlapping coverage area 116 may be registered with either macrocell 118 or macrocell 106. The UE 108 selects the optimal base station, from among the available base stations, based on metrics including a signal quality associated with each base station. In some embodiments, the signal quality may be based on a signal strength, which is a function of the distance of UE 108 from the macrocell base station.

For illustrative purposes only, UE 108 may determine that BCH 110 from macrocell base station 104 has the highest signal quality. The UE 108 may then perform a registration process through macrocell base station 104, which results in UE 108 becoming registered with macrocell base station 104. Therefore, UE 108 may then communicate with the mobile telecommunication network through macrocell base station 104, rather than through macrocell base station 114.

Figure 1C:
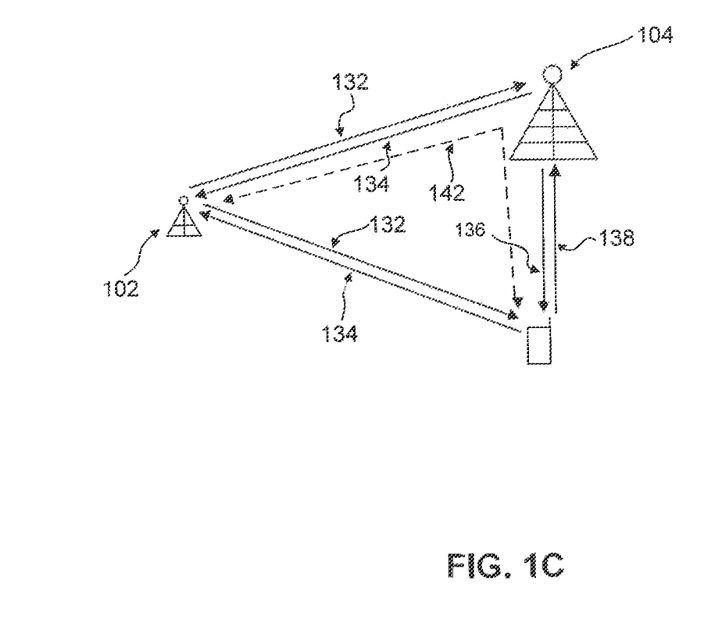
FIG. 1C illustrates a block diagram of a triangulation process of a mobile handset (UE) according to an exemplary embodiment of the present invention.

As discussed above, to avoid false alarm situations, a femtocell must determine whether a detected UE is actively within the coverage area for the femtocell. One technique used to determine positions is triangulation. FIG. 1C is a block diagram of a triangulation process of a UE 140, according to an exemplary embodiment of the present invention, is illustrated.

In an embodiment, femtocell 102 is configured to determine the position of UE 140, and to compare UE 140's position to femtocell geographic coverage area 126. Femtocell 102 is capable of determining UE 140's position because femtocell 102 knows its own location and it can also determine the location of macrocell base station 104. Using these pieces of information, femtocell 102 can determine the location of UE 140 through triangulation. For example, femtocell 102 may be configured to transmit a random access (RACH) 132 to both macrocell base station 104 and UE 140, and to determine corresponding round-trip delays for each transmitted RACH 132. A round-trip delay is a combined delay associated with transmitted RACH 132 and a returned RACH 134. Femtocell 102 then uses the round-trip delay statistics to calculate a current position of UE 140.

Under theoretical conditions, the corresponding round-trip delays from UE 140 and from macrocell base station 104 should be the same, because UE 140 is registered to macrocell base station 104. However, the round-trip delays from macrocell base station 104 and UE 140 are in actuality not identical because there is an additional propagation delay associated with UE 140 as a result of UE 140 not being collocated with macrocell base station 104. Therefore, a round-trip delay from femtocell 102 to macrocell base station 104, then to UE 140 and back to femtocell 102 (e.g. shown in FIG. 1C as combined signal path 142) includes the round-trip delay from macrocell base station 104 (e.g. transmitted RACH 132 plus returned RACH 134) plus the propagation delay of signal 136 from macrocell base station 104 to UE 140 and of signal 138 from UE 140 back to macrocell base station 104.

Therefore, once the location of macrocell base station 104 is known, femtocell 102 may perform the triangulation of UE 140 by measuring the round-trip delay between femtocell 102 and UE 140 (e.g. transmitted RACH 132 plus returned RACH 134), as well as the round-trip delay of combined signal path 142. Using UE 140's position, femtocell 102 can then prevent false alarm situations because when femtocell 102 determines that UE 140 is located outside of femtocell geographic coverage area 126 (shown in FIG. 1 as UE 108), femtocell 102 will not turn "ON," even if it detects uplink 128 or downlinks 130. Femtocell 102 may perform the triangulation for every uplink 128 and/or downlink 130 that it detects. Thus, femtocell 102 only turns "ON" and enables its transmitter when UE 140 is located within femtocell geographic coverage area 126 (shown in FIG. 1 as second UE 124).

The triangulation and corresponding false alarm prevention performed by femtocell 102 is transparent to UE 108 and second UE 124. Thus, UE 108 and second UE 124 may not be aware that there may be potential femtocells in the vicinity. Specifically, until femtocell 102 is turned "ON," UE 108 and second UE 124 are only able to detect the presence of macrocell base station 104 (UE 108 may also detect the presence of macrocell base station 114). However, once femtocell 102 does turn itself "ON," a handover may be performed from macrocell base station 104 to femtocell 102, immediately after a call setup occurs involving second UE 124. However, the handover only occurs when second UE 124 is within femtocell geographic coverage area 126 and when second UE 124 determines that criteria associated with femtocell 102 are met.

The specific references to femtocell 102, macrocell base station 104, UE 108 and second UE 124 are for illustrative purposes only. As will be apparent to those skilled in the relevant art(s), macrocellular network 100 may include other femtocells, macrocells and UE, all of which may be positioned at different locations within macrocellular network 100 without departing from the spirit and scope of the present disclosure.

Figure 2:
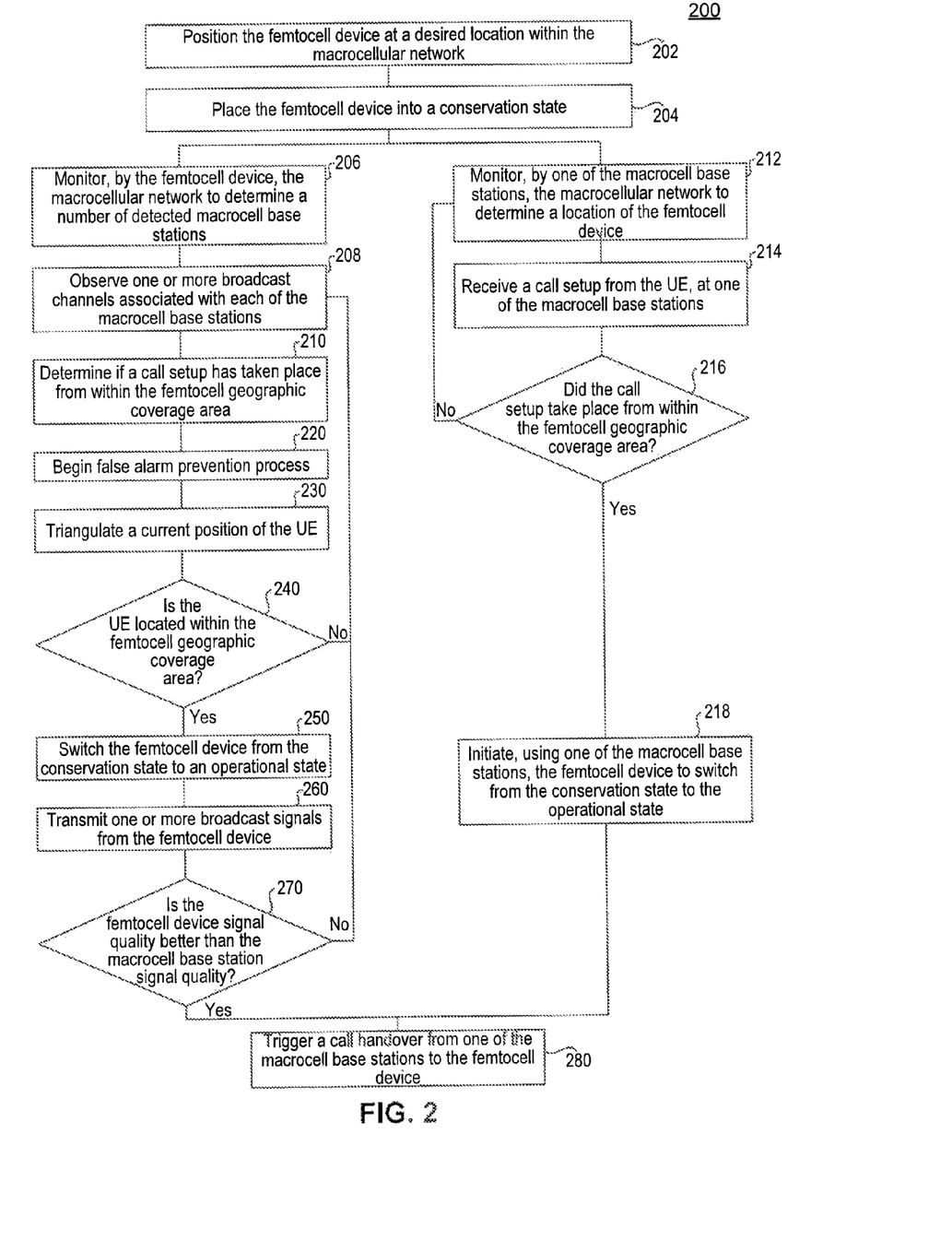
FIG. 2 is a flowchart of an exemplary method for implementing a "green" femtocell in accordance with existing cellular standards, according to an exemplary embodiment of the present invention.

An Exemplary Method of Implementing a "Green" Femtocell in Accordance with Existing Cellular Standards FIG. 2 is a flowchart of exemplary method for implementing a "green" femtocell according to an exemplary embodiment of the present invention. The disclosure is not limited to this operational description. Rather, it will be apparent to persons skilled in the relevant art(s) from the teachings herein that other operational control flows are within the scope and spirit of the present disclosure. The following discussion describes the steps in FIG. 2. The flowchart of FIG. 2 is described with reference to embodiments of FIGS. 1A-1C. However, a method 200 is not limited to these embodiments.

A method 200 begins at step 202, where femtocell 102 is positioned at a desired location within macrocellular network 100.

In step 204, femtocell 102 is placed into a conservation state such that femtocell 102 is not transmitting either a BCH or a pilot. In some embodiments, a user may place femtocell 102 into the conservation state, while in other embodiments the network may place the femtocell into the conversation state. Femtocell 102 may further be placed into the conversation state based on a default setting.

The method then either proceeds to step 206 or to step 212 based on which cell will ultimately be monitoring macrocellular network 100. If the method proceeds to step 206, then femtocell 102 monitors macrocellular network 100 to determine a total number of macrocell base stations detected by the femtocell 102.

In step 208, femtocell 102 observes one or more broadcast channels associated with each of the macrocells that are detected by femtocell 102. For example, when femtocell 102 determines that the only macrocell present within macrocellular network 100 is macrocell base station 104, then femtocell 102 is configured to monitor BCH 110 and pilot 112, which represent the broadcast channels associated with macrocell base station 104. Also, in some embodiments, this may require that femtocell 102 be configured to monitor uplink 128, downlinks 130, or both uplink 128 and downlinks 130.

In step 210, femtocell 102 determines if a call setup involving a UE has taken place from within femtocell geographic coverage area 126. The call setup may be a call delivery to the UE or it may be a request for a call initiation from the UE.

In step 220, femtocell 102 begins a false alarm prevention process to prevent instances when femtocell 102 may trigger itself to turn "ON" even when the UE is not within femtocell geographic coverage area 126.

In step 230, femtocell 102 determines the current position of the UE. One technique for determining femtocell 102's position is triangulation. Femtocell 102 establishes the locations of the macrocell base stations detected by the femtocell 102. Femtocell 102 then transmits a RACH 132 and determines the resulting round-trip delay from both macrocell base station 104 and the UE. Femtocell 102 may then use its own location, the known location of macrocell base station 104, and these round-trip delays, in conjunction with a propagation delay between macrocell base station 104 and the UE, to calculate the current position of the UE. For example, femtocell 102 may perform the triangulation of the UE by measuring the time of arrival of the returned RACH 134 coming from the UE, which represents a distance between the UE and femtocell 102.

In step 240, a decision is made as to whether the UE is located within femtocell geographic coverage area 126 based on the current position of the UE. If the UE is not located within the geographic coverage area 126, then the method returns to step 208 where femtocell 102 observes the one or more broadcast channels associated with each of the macrocell base stations present within macrocellular network 100.

If the UE is located within the femtocell geographic area, then the method proceeds to step 250 where femtocell 102 switches from the conservation state to an operational state.

In step 260, femtocell 102 begins transmitting one or more broadcast channels. For example, the one or more broadcast channels may represent a BCH and a pilot associated with femtocell 102.

In step 270, a decision is made whether to cause a handover from the macrocell base station 104 to the femtocell 102. In an embodiment, one basis for that decision may be the relative signal qualities of the macrocell base station 104 and the femtocell 102. In an embodiment, the signal quality of femtocell 102 may be better than the signal quality of macrocell base station 104 because femtocell 102 may be located at a shorter distance from second UE 124 than the macrocell base station 104. If the determination at step 270 is no, then the method returns to step 208.

Alternatively, if the determination is made to handover the call, then the method proceeds to step 280.

In step 280, the UE triggers a call handover from macrocell base station 104 to femtocell 102, such that second UE 124 begins to communicate with the wireless network via femtocell 102. Femtocell 102 may thus perform at least some of the communication functionality that was previously being performed by macrocell base station 104. Femtocell 102 is configured to only transmit a signal during periods when at least one call or data session is active. Second UE 124 may trigger the call handover to femtocell 102 within approximately several hundreds of a millisecond from the call setup. Therefore, by only switching to the operational state, and only triggering the call handover, at these specifically enumerated instances, femtocell 102 is configured to conserve power, reduce radiation emissions and minimize interference towards WiFi, towards other femtocells, or towards macrocells.

Alternatively, after step 204, the method may proceed to step 212 if macrocell base station 104 is performing the monitoring of the macrocellular network 100 to determine a location of femtocell 102. For example, femtocell 102 may send a signal to macrocell base station 104 at predetermined intervals to periodically update its location with macrocell base station 104. In an embodiment, these predetermined intervals may be set by a service provider. Also, these predetermined intervals may vary depending on a variety of factors, such as the time of day or a number of detected UEs within macrocellular network 100, to provide some examples. In some embodiments, macrocell base station 104 may possess prior knowledge of a location of femtocell 102. Therefore, macrocell base station 104 may not have to currently monitor macrocellular network 100 to obtain the location of femtocell 102.

In step 214, macrocell base station 104 receives a call setup from a UE.

In step 216, a determination is made as to whether the call setup occurred from a UE located within femtocell geographic coverage area 126. If the determination is no, then the method returns to step 212. If the determination is yes, then the method proceeds to step 218.

In step 218, macrocell base station 104 causes femtocell 102 to switch from the conservation state to the operational state by sending an activation signal to femtocell 102. In an embodiment, if there are multiple femtocells within macrocellular network 100 capable of servicing the UE, then macrocell base station 104 may "wake-up" any number of those femtocells. Macrocell base station 104 may then perform a calculation to determine which of those femtocells has the highest signal quality, and macrocell base station 104 may then return each of the remaining femtocells, if any, to their conservation states. The method then also proceeds to step 280, where the UE triggers a call handover from macrocell base station 104 to femtocell 102, such that second UE 124 begins to communicate with the core mobile telecommunication network via femtocell 102

An Exemplary Method of Implementing a "Green" Femtocell

Figure 3:
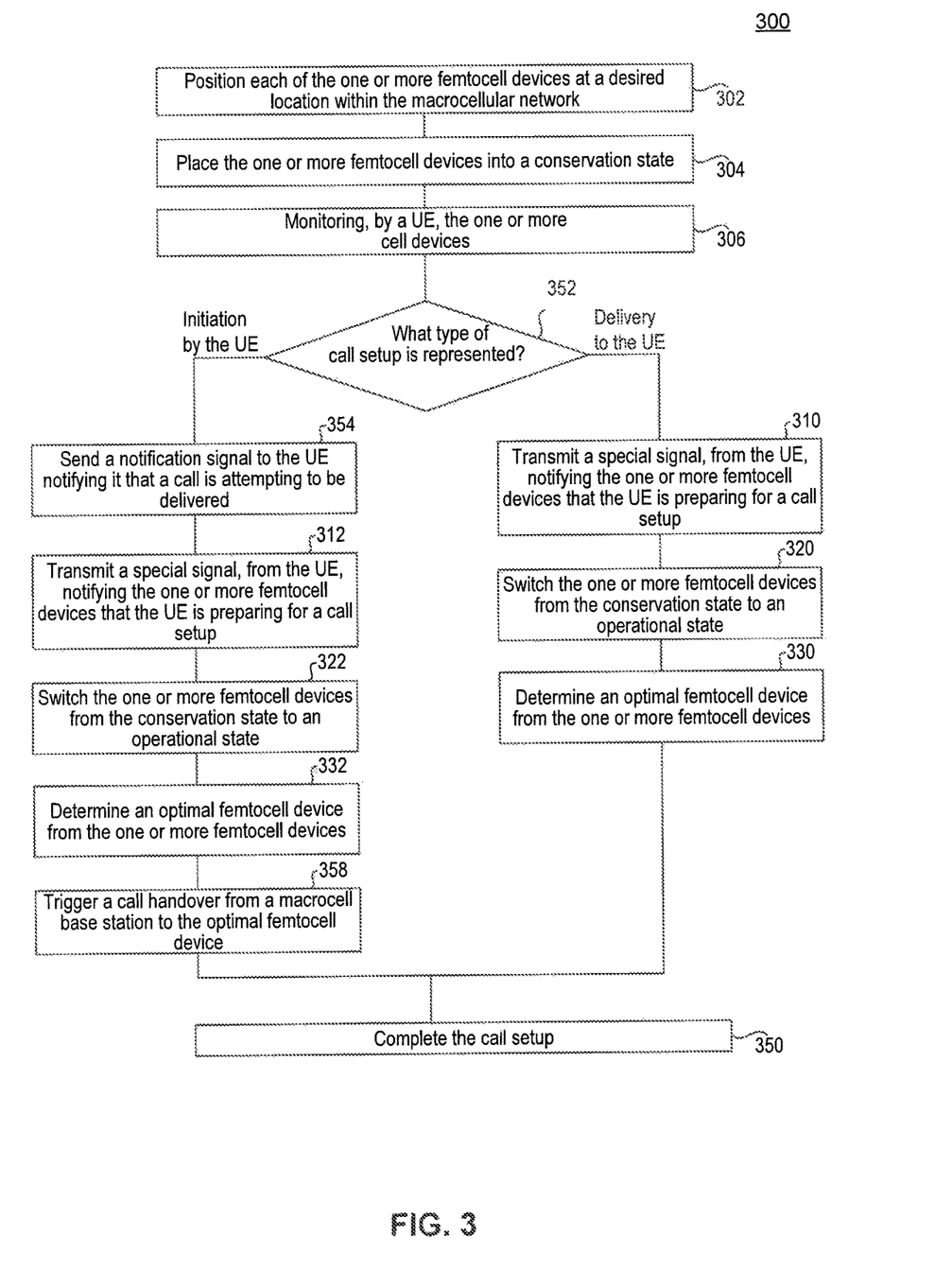
FIG. 3 is a flowchart of an alternate method for providing a "green" femtocell according to an exemplary embodiment of the present invention.

FIG. 3 is a flowchart of an alternate method for providing a "green" femtocell, according to an exemplary embodiment of the present invention. The disclosure is not limited to this operational description. Rather, it will be apparent to persons skilled in the relevant art(s) from the teachings herein that other operational control flows are within the scope and spirit of the present disclosure. The following discussion describes the steps in FIG. 3. The flowchart of FIG. 3 is described with reference to embodiments of FIGS. 1A-1C. However, a method 300 is not limited to these embodiments.

The method 300 may be implemented using an updated version of a cellular handset (UE), which may have at least some additional functionality beyond the functionality required by the existing mobile standards (e.g., GSM, 2G, 3G or LTE).

The method 300 begins at step 302, where the one or more femtocells are positioned at a desired locations within macrocellular network 100.

In step 304, one or more femtocells are placed into a conservation state such that the one or more femtocells are not transmitting either a BCH or a pilot. As discussed above, in some embodiments, a user may place femtocell 102 into the conservation state, while in other embodiments the network may place the femtocell into the conversation state. Femtocell 102 may further be placed into the conversation state based on a default setting.

In step 306, the UE monitors the macrocellular network 100 to detect the cells present in the vicinity.

In step 352, a determination is made as to whether the UE is attempting to engage in a call setup, and whether the call setup represents a call delivery to the UE. As discussed previously in this disclosure, the call setup may represent either a call delivery to the UE, or a call initiation from the UE. If the determination is yes, then the method proceeds to step 354.

In step 354, macrocell base station 104 sends a notification signal to the UE, notifying it that a call is attempting to be delivered. The method then proceeds to step 312.

In step 312, the UE transmits a special signal to notify the one or more femtocells that the UE is preparing to engage in a call setup. The special signal may be substantially similar to the RACH 132 that is transmitted from femtocell 102, as discussed above. The special signal may be configured such that any macrocell base stations, which may be present within macrocellular network 100, substantially ignore the special signal because the content is not applicable to the macrocell base stations.

In step 322, upon receipt of this signal, femtocell 102 switches from the conservation state to an operational state.

In step 332, the UE determines an optimal femtocell from the one or more femtocells positioned within macrocellular network 100. In particular, each of the one or more femtocells begins to transmit a BCH and a pilot, after which, the UE may then determine the optimal femtocell. In an embodiment, one basis for that determination may be the relative signal qualities of each of the femtocells. For example, the signal quality of one femtocell may be better than the signal quality of another femtocell because the one femtocell may be located at a shorter distance from the UE than the other femtocell.

In step 358, macrocell base station 104 triggers a call handover from macrocell base station 104 to the optimal femtocell. Thus, the optimal femtocell is configured to only transmit a signal during periods when at least one call or data session is active. Additionally, if any femtocells remain from the one or more femtocells, the remaining femtocells are returned to the conservation state, such that they no longer transmit either the BCH or the pilot. Following step 358, the method then proceeds to step 350.

In step 350, the call setup is completed such that the UE begins to communicate with the wireless network via the optimal femtocell.

Alternatively, if the determination at step 352 is that a call is being initiated by the UE, then the method proceeds to step 310.

In step 310, the UE transmits a special signal to notify the one or more femtocells that the UE is preparing to initiate a call. The special signal may be substantially similar to the RACH 132 that is transmitted from femtocell 102, as discussed above. The special signal may be configured such that any macrocell base stations, which may be present within macrocellular network 100, substantially ignore the special signal because the content is not applicable to the macrocell base stations.

In step 320, upon receipt of this signal, femtocell 102 switches from the conservation state to an operational state.

In step 330, the UE determines an optimal femtocell from the one or more femtocells positioned within macrocellular network 100. In particular, each of the one or more femtocells begins to transmit a BCH and a pilot, after which, the UE may then determine the optimal femtocell. Following step 330, the method then also proceeds to step 350, where the call setup is completed such that the UE begins to communicate with the wireless network via the optimal femtocell.

CONCLUSION

The exemplary embodiments described herein are provided for illustrative purposes, and are not limiting. Other exemplary embodiments are possible, and modifications may be made to the exemplary embodiments within the spirit and scope of the invention.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A femtocell for conserving power, comprising:
   a transmitter module of the femtocell configured to be inactive for periods of call inactivity and data inactivity within a corresponding femtocell geographic coverage area;
   a monitoring device of the femtocell configured to monitor the femtocell geographic coverage area for a presence of a cellular handset device; and
   a controller module of the femtocell configured to calculate a location of the cellular handset device based on a first random access channel (RACH) transmitted to a macrocell base station from the femtocell and a second RACH transmitted to the cellular handset device, and to activate the transmitter module upon receipt of a special signal from the cellular handset device based on the location of the cellular handset device,
wherein the special signal is received by the femtocell from the cellular handset device:
upon a call initiated by the cellular handset device, the call being setup without use of the macrocell base station; or upon a call received by the cellular handset device, the call being setup by the macrocell base station, and
wherein a content of the special signal is inapplicable to the macrocell base station.

2. The femtocell of claim 1, wherein the monitoring device is further configured to monitor an uplink, from the cellular handset device to one or more macrocell base stations, and a downlink, from the one or more macrocell base stations to the cellular handset device.

3. The femtocell of claim 1, wherein the transmitter module is configured to transmit a broadcast channel (BCH) and a pilot when the transmitter module is activated.

4. The femtocell of claim 1, wherein the controller module is further configured to compare the location of the cellular handset device to the femtocell geographic coverage area, and activate the transmitter module when the special signal is received and the location of the cellular handset device is within the femtocell geographic coverage area.

5. The femtocell of claim 4, wherein the controller module is further configured to calculate the location of the cellular handset device based on a corresponding delay for the first RACH transmitted to the macrocell base station and a corresponding delay for the second RACH transmitted to the cellular handset device.

6. The femtocell of claim 5, wherein the controller module is further configured to calculate the location of the cellular handset device based on the corresponding delay for the first RACH transmitted to the macrocell base station, the corresponding delay for the second RACH transmitted to the cellular handset device, and a propagation delay between the macrocell base station and the cellular handset device.

7. The femtocell of claim 1, wherein the controller module is configured to cause a call handover to the femtocell upon the call received by the cellular handset device and when a femtocell signal quality is better than a macrocell base station signal quality.

8. The femtocell of claim 1, wherein the call handover occurs prior to the call being setup.

9. The femtocell of claim 1, wherein the femtocell is configured to initiate the call handover upon detection of the cell being setup, and wherein the call being setup involves the cellular handset device and the macrocell base station.

10. The femtocell of claim 1, wherein the femtocell is configured to detect the call being setup by monitoring a broadcast channel (BCH) and a pilot transmitted by the macrocell base station.

11. The femtocell of claim 1, wherein the monitoring device monitors the femtocell geographic coverage area for presence of the cellular handset device by monitoring a broadcast channel (BCH) and a pilot signal.

12. The femtocell of claim 11, wherein the monitoring device further monitors the femtocell geographic coverage area for a presence of the macrocell base station.

13. A method for conserving power in a femtocell, comprising:
placing the femtocell into a power conservation state;
monitoring a macrocellular network to determine whether a macrocell base station is detected;
observing one or more broadcast channels associated with the detected macrocell base station;
calculating, at the femtocell, a location of a cellular handset device based on a random access channel (RACH) transmitted to the detected macrocell base station from the femtocell, and a RACH transmitted to the cellular handset device;
detecting a call setup message involving the cellular handset device;
switching the femtocell from the conservation state to an operational state;
transmitting a broadcast signal from the femtocell; and
causing a call handover from the macrocell base station to the femtocell.

14. The method of claim 13, further comprising determining whether the calculated location of the cellular handset device is within a femtocell geographic coverage area.

15. The method of claim 14, wherein the determining whether the calculated location of the cellular handset device is within the femtocell geographic coverage area comprises:
sending the RACH to the macrocell base station within the macrocellular network and to the cellular handset device;
calculating a corresponding delay for the RACH transmitted to the macrocell base station within the macrocellular network and a corresponding delay for the RACH transmitted to the cellular handset device;
triangulating the location of the cellular handset device based on the corresponding delays; and
comparing the location of the cellular handset device to the femtocell geographic coverage area.

16. The method of claim 15, further comprising:
activating a transmitter module, included within the femtocell, when the location of the cellular handset device is within the femtocell geographic coverage area.

17. The method of claim 14, further comprising determining that the detected call setup message is not false based on the determining of whether the calculated location of the cellular handset device is within the femtocell geographic coverage area.

18. The method of claim 14, further comprising determining that the call setup message occurred within the femtocell geographic coverage area based on the location of a cellular handset device before the switching the femtocell from the conservation state to the operational state.

19. The method of claim 13,
wherein the monitoring is performed by the macrocell base station, located within the macrocellular network, to determine a location of the femtocell,
wherein the switching the femtocell from the conservation state to the operational state is initiated by the macrocell base station sending an activation signal to the femtocell.

20. The method of claim 13, wherein in the conservation state a transmitter of the femtocell is turned off and in the operational state the transmitter is turned on.

* * * * *